United States Patent
Villaron et al.

(10) Patent No.: US 7,752,632 B2
(45) Date of Patent: Jul. 6, 2010

(54) METHOD AND SYSTEM FOR EXPOSING NESTED DATA IN A COMPUTER-GENERATED DOCUMENT IN A TRANSPARENT MANNER

(75) Inventors: Shawn Alan Villaron, San Jose, CA (US); Brian Jones, Redmond, WA (US); Chad Rothschiller, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 11/019,095

(22) Filed: Dec. 21, 2004

(65) Prior Publication Data

US 2006/0136553 A1 Jun. 22, 2006

(51) Int. Cl.
 *G06F 3/00* (2006.01)
 *G06F 9/44* (2006.01)
 *G06F 9/46* (2006.01)
 *G06F 13/00* (2006.01)

(52) U.S. Cl. ...................... 719/313; 715/209

(58) Field of Classification Search ......... 715/200–204, 715/209, 210, 234; 719/310–320, 328; 717/104–123
See application file for complete search history.

(56) References Cited

U.S. PATENT DOCUMENTS

| | | | |
|---|---|---|---|
| 4,410,286 A | 10/1983 | Ko et al. | |
| 4,594,674 A | 6/1986 | Boulia et al. | |
| 4,649,513 A | 3/1987 | Martin et al. | |
| 4,870,611 A | 9/1989 | Martin et al. | |
| 5,222,205 A | 6/1993 | Larson et al. | |
| 5,267,155 A | 11/1993 | Buchanan et al. | |
| 5,469,533 A | 11/1995 | Dennis | |
| 5,487,138 A | 1/1996 | Rust et al. | |
| 5,537,526 A | 7/1996 | Anderson et al. | |
| 5,579,466 A | 11/1996 | Habib et al. | |
| 5,579,519 A | 11/1996 | Pelletier | |

(Continued)

FOREIGN PATENT DOCUMENTS

EP 1 376 387 A2 1/2004

(Continued)

OTHER PUBLICATIONS

"Comparative Assessment of Open Documents Formats Market Overview—Valoris", 2003, http://europa.eu/int/idabc/en/document/3439, retrieved on Apr. 10, 2008, 40 pp.

(Continued)

*Primary Examiner*—Diem Ky Cao
(74) *Attorney, Agent, or Firm*—Merchant & Gould P.C.

(57) ABSTRACT

Methods and systems are provided for exposing nested data in computer-generated documents in a transparent manner. A mechanism is provided for a client application to query a server application for a list of available file formats after an object is requested from a server application document for embedding into a client application document. Another mechanism is provided for the client application to request a particular format associated with the embedded object from the server application document. Once the client application obtains file format information available to the server application or associated with the particular object, the client application may utilize the obtained file formats for utilizing or operating on the embedded object according to the native file formats associated with the embedded object.

17 Claims, 3 Drawing Sheets

U.S. PATENT DOCUMENTS

| | | | |
|---|---|---|---|
| 5,613,124 | A | 3/1997 | Atkinson et al. |
| 5,655,130 | A | 8/1997 | Dodge et al. |
| 5,675,788 | A | 10/1997 | Husick et al. |
| 5,692,157 | A * | 11/1997 | Williams .................... 709/246 |
| 5,701,342 | A | 12/1997 | Anderson et al. |
| 5,740,439 | A * | 4/1998 | Atkinson et al. ............ 719/320 |
| 5,745,910 | A | 4/1998 | Piersol et al. |
| 5,752,055 | A | 5/1998 | Redpath et al. |
| 5,752,056 | A | 5/1998 | Celik |
| 5,819,295 | A | 10/1998 | Nakagawa et al. |
| 5,845,058 | A | 12/1998 | Shaw et al. |
| 5,893,109 | A | 4/1999 | DeRose et al. |
| 5,903,903 | A | 5/1999 | Kennedy |
| 5,903,905 | A | 5/1999 | Andersen et al. |
| 5,905,504 | A | 5/1999 | Barkans et al. |
| 5,911,776 | A | 6/1999 | Guck |
| 5,950,215 | A | 9/1999 | Tabuchi |
| 5,960,168 | A | 9/1999 | Shaw et al. |
| 5,993,088 | A | 11/1999 | Nogay et al. |
| 6,023,714 | A | 2/2000 | Hill et al. |
| 6,026,416 | A | 2/2000 | Kanerva et al. |
| 6,067,531 | A | 5/2000 | Hoyt et al. |
| 6,094,665 | A | 7/2000 | Lyons et al. |
| 6,134,552 | A | 10/2000 | Fritz et al. |
| 6,144,974 | A | 11/2000 | Gartland |
| 6,175,845 | B1 | 1/2001 | Smith et al. |
| 6,182,080 | B1 | 1/2001 | Clements |
| 6,182,096 | B1 | 1/2001 | Mastie et al. |
| 6,199,082 | B1 | 3/2001 | Ferrel et al. |
| 6,212,530 | B1 | 4/2001 | Kadlec |
| 6,247,018 | B1 | 6/2001 | Rheaume |
| 6,247,066 | B1 | 6/2001 | Tanaka |
| 6,269,403 | B1 | 7/2001 | Anders et al. |
| 6,342,904 | B1 | 1/2002 | Vasudevan et al. |
| 6,362,870 | B2 | 3/2002 | Mui et al. |
| 6,393,441 | B1 | 5/2002 | Kanerva et al. |
| 6,407,821 | B1 | 6/2002 | Hohensee et al. |
| 6,418,448 | B1 | 7/2002 | Sarkar |
| 6,449,653 | B2 | 9/2002 | Klemets et al. |
| 6,457,017 | B2 | 9/2002 | Watkins et al. |
| 6,480,206 | B2 | 11/2002 | Prinzing |
| 6,484,189 | B1 | 11/2002 | Gerlach et al. |
| 6,496,206 | B1 | 12/2002 | Mernyk et al. |
| 6,507,858 | B1 | 1/2003 | Kanerva et al. |
| 6,509,974 | B1 | 1/2003 | Hansen |
| 6,519,764 | B1 * | 2/2003 | Atkinson et al. ............ 717/120 |
| 6,538,760 | B1 | 3/2003 | deBry et al. |
| 6,549,918 | B1 | 4/2003 | Probert, Jr. et al. |
| 6,583,789 | B1 | 6/2003 | Carlson et al. |
| 6,591,278 | B1 | 7/2003 | Ernst |
| 6,604,144 | B1 | 8/2003 | Anders |
| 6,608,693 | B1 | 8/2003 | Loyd et al. |
| 6,609,200 | B2 | 8/2003 | Anderson et al. |
| 6,654,737 | B1 | 11/2003 | Nunez |
| 6,657,647 | B1 | 12/2003 | Bright |
| 6,658,477 | B1 | 12/2003 | Lisitsa et al. |
| 6,674,540 | B1 | 1/2004 | Wiechers et al. |
| 6,675,353 | B1 | 1/2004 | Friedman |
| 6,675,356 | B1 | 1/2004 | Adler et al. |
| 6,681,223 | B1 | 1/2004 | Sundaresan |
| 6,694,485 | B1 | 2/2004 | Kelley et al. |
| 6,715,126 | B1 | 3/2004 | Chang et al. |
| 6,763,343 | B1 | 7/2004 | Brooke et al. |
| 6,771,291 | B1 | 8/2004 | DiStefano, III |
| 6,781,609 | B1 | 8/2004 | Barker et al. |
| 6,785,673 | B1 | 8/2004 | Fernandez |
| 6,789,229 | B1 | 9/2004 | Dunietz et al. |
| 6,812,941 | B1 | 11/2004 | Brown et al. |
| 6,871,321 | B2 | 3/2005 | Wakayama |
| 6,910,843 | B2 | 6/2005 | Saw et al. |
| 6,912,555 | B2 | 6/2005 | Lemon et al. |
| 6,918,082 | B1 | 7/2005 | Gross et al. |
| 6,925,597 | B2 | 8/2005 | Anwar |
| 6,925,631 | B2 | 8/2005 | Golden |
| 6,931,590 | B2 | 8/2005 | Kanie et al. |
| 6,938,203 | B1 | 8/2005 | Dimarco et al. |
| 6,941,510 | B1 | 9/2005 | Ozzie et al. |
| 6,952,801 | B2 | 10/2005 | Warmus et al. |
| 6,961,902 | B2 | 11/2005 | Anecki et al. |
| 6,981,207 | B1 | 12/2005 | Bakman et al. |
| 6,993,527 | B1 | 1/2006 | Raman et al. |
| 7,036,076 | B2 | 4/2006 | Anwar |
| 7,051,276 | B1 | 5/2006 | Mogilevsky et al. |
| 7,054,841 | B1 | 5/2006 | Tenorio |
| 7,080,083 | B2 | 7/2006 | Kim et al. |
| 7,134,071 | B2 | 11/2006 | Ohwada et al. |
| 7,168,035 | B1 | 1/2007 | Bell et al. |
| 7,171,618 | B2 | 1/2007 | Harrington et al. |
| 7,290,205 | B2 | 10/2007 | Monocsko et al. |
| 7,301,544 | B2 | 11/2007 | Yuan |
| 7,412,649 | B2 | 8/2008 | Emek et al. |
| 7,418,652 | B2 | 8/2008 | Ornstein et al. |
| 7,487,448 | B2 | 2/2009 | Emerson et al. |
| 7,549,118 | B2 | 6/2009 | Shur et al. |
| 2001/0003828 | A1 | 6/2001 | Peterson et al. |
| 2001/0013043 | A1 | 8/2001 | Wagner |
| 2001/0016842 | A1 | 8/2001 | Umen et al. |
| 2001/0018697 | A1 | 8/2001 | Kunitake et al. |
| 2001/0034739 | A1 | 10/2001 | Anecki et al. |
| 2001/0039552 | A1 | 11/2001 | Killi et al. |
| 2001/0044809 | A1 | 11/2001 | Parasnis et al. |
| 2001/0044813 | A1 | 11/2001 | Frank |
| 2001/0051962 | A1 | 12/2001 | Piotkin |
| 2001/0054042 | A1 | 12/2001 | Watkins et al. |
| 2002/0004805 | A1 | 1/2002 | Nojima et al. |
| 2002/0016800 | A1 | 2/2002 | Spivak et al. |
| 2002/0038348 | A1 | 3/2002 | Malone et al. |
| 2002/0049790 | A1 | 4/2002 | Ricker et al. |
| 2002/0059265 | A1 | 5/2002 | Valorose |
| 2002/0059337 | A1 | 5/2002 | Takaoka et al. |
| 2002/0065848 | A1 | 5/2002 | Walker et al. |
| 2002/0065849 | A1 * | 5/2002 | Ferguson et al. ............ 707/513 |
| 2002/0065857 | A1 | 5/2002 | Michalewicz |
| 2002/0073236 | A1 | 6/2002 | Helgeson et al. |
| 2002/0087602 | A1 | 7/2002 | Masuda et al. |
| 2002/0099797 | A1 | 7/2002 | Merrell et al. |
| 2002/0103835 | A1 | 8/2002 | Kearney |
| 2002/0107886 | A1 | 8/2002 | Gentner et al. |
| 2002/0111133 | A1 | 8/2002 | Wittkotter |
| 2002/0116416 | A1 | 8/2002 | Tesch et al. |
| 2002/0116421 | A1 | 8/2002 | Fox et al. |
| 2002/0120647 | A1 | 8/2002 | Amano |
| 2002/0129058 | A1 | 9/2002 | Story et al. |
| 2002/0174145 | A1 | 11/2002 | Duga et al. |
| 2002/0184263 | A1 | 12/2002 | Perinet et al. |
| 2002/0188638 | A1 | 12/2002 | Hamscher |
| 2002/0194220 | A1 | 12/2002 | Sluiman |
| 2003/0004957 | A1 | 1/2003 | Broman et al. |
| 2003/0023637 | A1 | 1/2003 | Halahmi |
| 2003/0028560 | A1 | 2/2003 | Kudrolli et al. |
| 2003/0033287 | A1 | 2/2003 | Shanahan et al. |
| 2003/0046317 | A1 | 3/2003 | Cseri et al. |
| 2003/0065946 | A1 | 4/2003 | Holliday et al. |
| 2003/0074633 | A1 | 4/2003 | Boulmakoul et al. |
| 2003/0079181 | A1 | 4/2003 | Schumacher et al. |
| 2003/0093520 | A1 | 5/2003 | Beesley |
| 2003/0115547 | A1 | 6/2003 | Ohwada et al. |
| 2003/0120671 | A1 | 6/2003 | Kim et al. |
| 2003/0126136 | A1 | 7/2003 | Omoigui |
| 2003/0126260 | A1 | 7/2003 | Husain et al. |
| 2003/0137539 | A1 | 7/2003 | Dees |
| 2003/0137691 | A1 | 7/2003 | Tanaka |
| 2003/0142128 | A1 | 7/2003 | Reulein et al. |
| 2003/0145134 | A1 | 7/2003 | Wehage et al. |

| | | |
|---|---|---|
| 2003/0149934 A1 | 8/2003 | Worden ................ 715/513 |
| 2003/0149935 A1 | 8/2003 | Takizawa et al. ............ 715/513 |
| 2003/0158851 A1 | 8/2003 | Britton et al. |
| 2003/0163552 A1 | 8/2003 | Savitzky et al. |
| 2003/0167446 A1 | 9/2003 | Thomas ................ 715/513 |
| 2003/0172168 A1 | 9/2003 | Mak et al. |
| 2003/0172343 A1 | 9/2003 | Leymaster et al. |
| 2003/0177446 A1 | 9/2003 | Gropper et al. |
| 2003/0177449 A1 | 9/2003 | Rose .................... 715/530 |
| 2003/0182450 A1 | 9/2003 | Ong et al. |
| 2003/0182656 A1 | 9/2003 | Leathers et al. |
| 2003/0195784 A1 | 10/2003 | Smith |
| 2003/0196176 A1 | 10/2003 | Abu-Ghazalah et al. |
| 2003/0221167 A1 | 11/2003 | Goldstein et al. ............ 715/513 |
| 2003/0222890 A1 | 12/2003 | Salesin et al. |
| 2003/0229845 A1 | 12/2003 | Salesin et al. |
| 2003/0233420 A1 | 12/2003 | Stark et al. |
| 2003/0237048 A1 | 12/2003 | Jones et al. |
| 2003/0237049 A1 | 12/2003 | Sawicki et al. |
| 2004/0003343 A1 | 1/2004 | Liao et al. |
| 2004/0003388 A1 | 1/2004 | Jacquemot et al. |
| 2004/0015782 A1 | 1/2004 | Day et al. |
| 2004/0015890 A1 | 1/2004 | Wong et al. |
| 2004/0015908 A1 | 1/2004 | Giel et al. |
| 2004/0019853 A1 | 1/2004 | Takizawa et al. ............ 715/523 |
| 2004/0030711 A1 | 2/2004 | Roudot |
| 2004/0030987 A1 | 2/2004 | Manelli |
| 2004/0034848 A1 | 2/2004 | Moore et al. |
| 2004/0049737 A1 | 3/2004 | Simon et al. |
| 2004/0054669 A1 | 3/2004 | Seyrat et al. |
| 2004/0054967 A1 | 3/2004 | Brandenberger |
| 2004/0066527 A1 | 4/2004 | Kloosterman et al. |
| 2004/0078755 A1 | 4/2004 | Shinjo et al. |
| 2004/0088332 A1 | 5/2004 | Lee et al. |
| 2004/0103073 A1 | 5/2004 | Blake et al. |
| 2004/0117733 A1 | 6/2004 | Moreau et al. |
| 2004/0128535 A1 | 7/2004 | Cheng |
| 2004/0128623 A1 | 7/2004 | Hudson |
| 2004/0139049 A1 | 7/2004 | Hancock et al. |
| 2004/0148278 A1 | 7/2004 | Milo et al. |
| 2004/0148567 A1 | 7/2004 | Jeon et al. |
| 2004/0153467 A1 | 8/2004 | Conover et al. |
| 2004/0172584 A1 | 9/2004 | Jones et al. |
| 2004/0172592 A1 | 9/2004 | Collie et al. |
| 2004/0181753 A1 | 9/2004 | Michaelides |
| 2004/0183837 A1 | 9/2004 | Watanabe et al. |
| 2004/0194025 A1 | 9/2004 | Hubert et al. |
| 2004/0205533 A1 | 10/2004 | Lopata et al. |
| 2004/0205539 A1 | 10/2004 | Mak et al. |
| 2004/0205580 A1 | 10/2004 | De Angelis et al. |
| 2004/0205623 A1 | 10/2004 | Weil et al. |
| 2004/0205653 A1 | 10/2004 | Hadfield et al. |
| 2004/0205656 A1 | 10/2004 | Reulein et al. |
| 2004/0216048 A1 | 10/2004 | Brown et al. |
| 2004/0221233 A1 | 11/2004 | Thielen |
| 2004/0225957 A1 | 11/2004 | Egilsson |
| 2004/0226012 A1 | 11/2004 | Awada et al. |
| 2004/0230894 A1 | 11/2004 | Elza et al. |
| 2004/0243551 A1 | 12/2004 | Boone et al. |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0022113 A1 | 1/2005 | Hanlon |
| 2005/0063010 A1 | 3/2005 | Giannetti |
| 2005/0066335 A1 | 3/2005 | Aarts .................... 719/316 |
| 2005/0071385 A1 | 3/2005 | Rao |
| 2005/0071755 A1 | 3/2005 | Harrington et al. |
| 2005/0091574 A1 | 4/2005 | Maaniitty et al. |
| 2005/0091575 A1 | 4/2005 | Relyea et al. |
| 2005/0099398 A1 | 5/2005 | Garside et al. |
| 2005/0105116 A1 | 5/2005 | Kobashi |
| 2005/0108001 A1 | 5/2005 | Aarskog |
| 2005/0108212 A1 | 5/2005 | Karimisetty et al. ............ 707/3 |
| 2005/0108278 A1 | 5/2005 | Jones et al. |
| 2005/0120061 A1 | 6/2005 | Kraft |
| 2005/0125720 A1 | 6/2005 | Little et al. |
| 2005/0125728 A1 | 6/2005 | Peiro et al. |
| 2005/0132279 A1 | 6/2005 | Relyea et al. |
| 2005/0144556 A1 | 6/2005 | Petersen et al. |
| 2005/0177784 A1 | 8/2005 | Andrews et al. |
| 2005/0192813 A1 | 9/2005 | Richard |
| 2005/0198561 A1 | 9/2005 | McAuley |
| 2005/0204016 A1 | 9/2005 | McAuley |
| 2005/0210026 A1 | 9/2005 | Wood |
| 2005/0223312 A1 | 10/2005 | Erdtmann et al. |
| 2005/0246724 A1 | 11/2005 | Foehr et al. |
| 2005/0248790 A1 | 11/2005 | Ornstein et al. |
| 2005/0249536 A1 | 11/2005 | Sedky et al. |
| 2005/0251739 A1 | 11/2005 | Shur et al. |
| 2005/0251740 A1 | 11/2005 | Shur et al. |
| 2005/0251742 A1 | 11/2005 | Mogilevsky et al. |
| 2005/0268221 A1 | 12/2005 | Shur et al. |
| 2005/0278616 A1 | 12/2005 | Eller |
| 2005/0278626 A1 | 12/2005 | Malik |
| 2006/0010371 A1 | 1/2006 | Shur et al. |
| 2006/0026585 A1 | 2/2006 | Haselden et al. |
| 2006/0031749 A1 | 2/2006 | Schramm et al. |
| 2006/0031758 A1 | 2/2006 | Shur et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0080314 A1 | 4/2006 | Hubert et al. |
| 2006/0080316 A1 | 4/2006 | Gilmore et al. |
| 2006/0080603 A1 | 4/2006 | Bailey et al. |
| 2006/0095834 A1 | 5/2006 | Jeon et al. |
| 2006/0117019 A1 | 6/2006 | Sylthe et al. |
| 2006/0136809 A1 | 6/2006 | Fernstrom |
| 2006/0155529 A1 | 7/2006 | Ludviksson et al. |
| 2006/0168562 A1 | 7/2006 | Emek et al. |
| 2006/0206794 A1 | 9/2006 | Ornstein et al. |
| 2006/0227150 A1 | 10/2006 | Yuan |
| 2007/0061384 A1 | 3/2007 | Harrington et al. |
| 2007/0136443 A1 | 6/2007 | Sah et al. |
| 2007/0136662 A1 | 6/2007 | Khaba |

FOREIGN PATENT DOCUMENTS

| | | |
|---|---|---|
| EP | 1 452 966 | 11/2004 |
| EP | 1 672 543 A2 | 11/2005 |
| EP | 1 672 528 A2 | 12/2005 |
| JP | 2003288334 | 10/2003 |
| KR | 20030048630 | 6/2003 |
| RU | 2202825 C2 | 4/2003 |
| WO | WO 99/01802 A2 | 1/1999 |
| WO | WO 01/44932 A1 | 6/2001 |
| WO | WO 01/80044 A2 | 10/2001 |
| WO | WO 02/21339 A2 | 3/2002 |
| WO | WO 03/009517 A2 | 1/2003 |
| WO | WO 03/021537 A1 | 3/2003 |
| WO | WO 2006/021673 | 6/2006 |
| WO | WO 2006/133053 A2 | 12/2006 |
| ZA | 2005/09350 | 4/2008 |

OTHER PUBLICATIONS

"Introduction to SpreadsheetML", Online Helpfile 'OFFICEXMLSDK.CHM' extracted from 'OFFICE2003XMLSCHEMA.EXE', Dec. 5, 2003 http://www.microsoft.com/downloads/details.aspx?familyid=fe118952-3547-420a-a412-00a2662442d9%displaying=en, retrieved on Apr. 10, 2008, 58 pp.

"Microsoft Announces Availability of Open and Royalty-Free License for Office 2003 XML Reference Schemas", Nov. 7, 2003, http://www.microsoft.com/presspass/press/2003/nov3/11-17XMLRefSchemaEMEAPR.mspx, retrieved on Apr. 10, 2008, 2 pp.

Anonymous: "Mulberry Slideshow XML (v 2.1): A User's Guide," Online Publication, Dec. 7, 2001, XP002404033; Retrieved from the Internet: URL:http://www.mulberrytech.com/slideshow/Mulberry-slideshow.zip on Oct. 20, 2006, 17 pp.

Anonymous: "Technical Note 2067: About the Keynote XML File Format (APXL Schema)," Online Publication, Feb. 12, 2003, XP002404032; Retrieved from the Internet: URL:http://developer.apple.com/technotes/tn2002/pdf/tn2067.pdf on Oct. 20, 2006, 26 pp.

Anonymous: "Technical note TN2073: Deconstructing A Keynote 1.x Document: Part One—Slides," Online Publication, May 20, 2003, XP002404031, Retrieved from the Internet: URL:http:///developer.apple.com/technotes/tn2002/pdf/tn2073.pdf on Oct. 20, 2006, 27 pp.

Brauer M. et al., "Open Office Specification 1.0," Online Publication, Mar. 22, 2004, XP002404030; Retrieved from the Internet: URL:http://www.oasis-open.org/committees/download.php/6037/office-spec-1.0-cd-1.pdf on Oct. 20, 2006, 607 pp.

Orchard et al. "[Editorial Draft] Versioning XML Languages W3C Proposed Tag Finding", http://www.w3.org/2001/tag/doc/versioning-20031116, Nov. 16, 2003, pp. 1-23.

Stop Typing the Same Thing, Website Documentation and Screendumps, 4Office Automation Inc., http://web.archive.org/web/20020418015130, http://www.4officeautomation.com/ReplyAssistant, copyright 2002, 4 pp. from download software.

U.S. Official Action mailed Oct. 18, 2005 in U.S. Appl. No. 10/837,040.

U.S. Official Action mailed Feb. 28, 2007 in U.S. Appl. No. 10/731,900.

U.S. Official Action mailed Aug. 9, 2007 in U.S. Appl. No. 10/731,900.

U.S. Official Action mailed Jul. 22, 2008 in U.S. Appl. No. 11/072,188.

U.S. Official Action mailed Oct. 30, 2008 in U.S. Appl. No. 11/125,907.

U.S. Official Action mailed Nov. 14, 2008 in U.S. Appl. No. 11/072,659.

U.S. Official Action mailed Dec. 17, 2008 in U.S. Appl. No. 11/019,088.

U.S. Official Action mailed Jan. 23, 2009 in U.S. Appl. No. 11/389,367.

U.S. Official Action mailed Feb. 4, 2009 in U.S. Appl. No. 11/445,903.

European Search Report dated Nov. 30, 2007 in EP 05105111.8.

European Examination Report dated Mar. 14, 2008 in EP 05105111.8.

European Examination Report dated Mar. 26, 2008 in EP 05111677.0.

European Search Report dated Apr. 22, 2008 in EP 05111549.1.

PCT Search Report dated Jun. 25, 2008 in PCT/US2006/21673.

Chinese Office Action dated Jul. 18, 2008 in 200510126789.6.

European Communication dated Jul. 22, 2008 in EP 05111549.1.

Chinese Office Action dated Aug. 1, 2008 in 200510126792.8.

Chinese Office Action dated Aug. 1, 2008 in 200510126798.5.

Chinese Office Action dated Aug. 22, 2008 in 200510125059.04.

Chinese Office Action dated Oct. 31, 2008 in 200510125058.X.

European Search Report dated Dec. 15, 2008 in EP 05111511.1.

Chinese First Office Action dated Jan. 9, 2009 in 200510127115.8.

Chinese Second Office Action dated Jan. 16, 2009 in 200510125062.6.

Chinese Second Office action dated Feb. 6, 2009 in 200510126789.6.

Chinese First Office Action dated Feb. 6, 2009 in 200510088462.4.

European Communication dated Mar. 12, 2009 in EP 05111375.1.

U.S. Official Action mailed May 14, 2008 in U.S. Appl. No. 10/731,900.

U.S. Official Action mailed Jun. 26, 2008 in U.S. Appl. No. 11/072,659.

U.S. Official Action mailed Jul. 09, 2008 in U.S. Appl. No. 11/019,088.

U.S. Official Action dated Mar. 7, 2007 in U.S. Appl. No. 11/018,912.

U.S. Official Action dated Jul. 26, 2007 in U.S. Appl. No. 11/018,569.

U.S. Appl. No. 11/072,188, filed Mar. 4, 2005 entitled "Method and Apparatus for Utilizing an Object Model to Manage Document Parts for Use in an Electronic Document".

U.S. Appl. No. 11/072,659, filed Mar. 4, 2005 entitled "Method and Apparatus for Utilizing an Extensible Markup Language Schema to Defined Document Parts for Use in an Electronic Document".

U.S. Appl. No. 11/125,907, filed May 10, 2005 entitled "Structuring an Electronic Document for Efficient Identification and Use of Document Parts".

U.S. Appl. No. 11/398,339, filed Apr. 5, 2006 entitled "Structuring Data for Word Processing Documents".

U.S. Appl. No. 11/445,903, filed Jun. 2, 2006 entitled "Structuring Data for Presentation Documents".

U.S. Appl. No. 11/431,931, filed May 10, 2006 entitled "Exposing Embedded Data in a Computer-Generated Document".

U.S. Appl. No. 11/389,367, filed Mar. 24, 2006 entitled "Structuring Data for Spreadsheet Application Documents".

U.S. Appl. No. 10/731,900, filed Dec. 9, 2003 entitled "Context Free Document Portions".

U.S. Appl. No. 10/955,622, filed Sep. 30, 2004 entitled "Method, System, and Computer-Readable Medium for Creating, Inserting and Reusing Document Parts in an Electronic Document".

U.S. Appl. No. 11/019,088, filed Dec. 20, 2004 entitled "Management and Use of Data in a Computer-Generated Document".

U.S. Appl. No. 11/018,718, filed Dec. 20, 2004 entitled "File Formats, Methods, and Computer Program Products for Representing Documents".

U.S. Appl. No. 11/018,569, filed Dec. 20, 2004 entitled "Method and System for Linking Data ranges of a Computer-Generated Document with Associated Extensible Markup Language Elements".

U.S. Appl. No. 11/018,910, filed Dec. 20, 2004 entitled "File Formats, Methods, and Computer Program Products for Representing Presentations".

U.S. Appl. No. 11/018,912, filed Dec. 20, 2004 entitled "File Formats, Methods, and Computer Program Products for Representing Workbooks".

U.S. Appl. No. 11/018,405, filed Dec. 20, 2004 entitled "Context-Free Document Portions with Alternate Formats".

U.S. Official Action mailed May 12, 2006 in U.S. Appl. No. 10/731,900.

Jones, B., "Word XML's Context Free Chunks: Building a Document from Multiple Pieces of Content", http://blogs.msdn.com/brian_jones_archive/2005/07/20/441167.aspx, Jul. 20, 2005, 4 pp.

Carrano, "Data Abstraction and Problem Solving with C++", copyright 1995, pp. 14-16.

U.S. Official Action mailed Apr. 16, 2009 in U.S. Appl. No. 11/072,188.

PCT Search Report dated Jul. 3, 2007 in PCT/US2006/21825.

European Communication dated Mar. 26, 2008 in EP 05112123.4.

Chinese Office Action dated Aug. 1, 2008 in 200510125062.6.

Chinese Second Office Action dated Mar. 6, 2009 in 200510126798.5.

European Search Report dated Mar. 11, 2009 in EP 05111550.9.

Adobe Creative Team, "Adobe Acrobat 5.0 Classroom in a Block", published Jun. 26, 2001, Adobe Press, pp. 1-26+cover page (27 pp.).

Chinese Second Office Action dated Mar. 13, 2009 in 200480001395.1, pp. 1-7.

Chinese Second Office Action dated Mar. 27, 2009 in 20040001339.08, pp. 1-7.

Chinese Decision on Rejection dated Mar. 27, 2009 in 200480001336.4, pp. 1-17.

Chinese Decision on Rejection dated May 8, 2009 in 200510125059.04, pp. 1-14.

Chinese Third Office Action dated Jun. 5, 2009 in 200510126789.6, pp. 1-7.

Russian Official Action dated Jan. 13, 2008 in 2412-139543RU/8132, pp. 1-9.

Proydakov, E.M., "English-Russian Explanatory Dictionary in Computing Engineering, Internet, and Programming", Moscow: publishing house "Russian edition", 2001, pp. 1-3.

Gudgin, M., "Soap Version 1.2 Part 1: Messaging Framework", W3C Candidate Recommendation (Dec. 19, 2002), pp. 1-65.

Chinese Second Office Action dated Jun. 5, 2009 in 200480001312.9, pp. 1-9.

Chinese Third Office Action dated Jul. 17, 2009 in 200480001395.01, pp. 1-7.

Fontaine, J., "moodss (Modular Object Oriented Dynamic Spreadsheet)", http://web.archive.org/web/20050311052520l/http://jfontain.free.fr/moodss.htm, published Mar. 11, 2005, 42 pp plus 1 wayback page (total 43 pp).

U.S. Official Action mailed Jul. 30, 2009 in U.S. Appl. No. 11/389,367, pp. 1-42.

U.S. Official Action mailed Aug. 4, 2009 in U.S. Appl. No. 11/072,659, pp. 1-33.

U.S. Official Action mailed Aug. 5, 2009 in U.S. Appl. No. 11/445,903, pp. 1-29.

U.S. Official Action mailed Aug. 6, 2009 in U.S. Appl. No. 11/431,931, pp. 1-54.

U.S. Official Action mailed Sep. 16, 2009 in U.S. Appl. No. 11/072,659, pp. 1-17.

Mexican Official Action dated Jun. 9, 2009 in PA/a/2005/012556, pp. 1-3.

Mexican Official Action dated Jun. 9, 2009 in PA/a/2005/012553, pp. 1-6.

U.S. Official Action mailed Oct. 5, 2009 in U.S. Appl. No. 11/072,188, pp. 1-23.

"@try inCSS3 (was: Useragent Rules in CSS)", http://lists.w3.org/Archives/Public/www-style/2004Mar/0333.html, 2 pages (Mar. 31, 2004).

"Apache Server Frequently Asked Questions", Apache HTTP Server Version 1.3, http://httpd.apache.org/docs/1.3/misc/FAQ.html; 43 pages.

"Controlling the Data Chaos by Adding Intelligence to Media", 4 pages (2004).

"Networked File System", http://www.scit.w1v.ac.uk/~jphb/comms/nfs.htm; 7 pages.

"Open eBook Publication Structure 1.2", http://www.idpf.org/oebps/oebps1.2/download/oeb12-xhtml.htm, 71 pages (Aug. 27, 2002).

Bleuthman et al., "Interleaved Graphics and Text", IBM Technical Disclosure Bulletin, vol. 22, No. 11, pp. 4813-4815 (Apr. 1980).

Chien et al., "Efficient Schemes for Managing Multiversion XML Documents", The VLDB Journal, vol. 11, pp. 332-353 (2002).

Christodoulakis et al., "Multimedia Document Presentation, Information, Extraction, and Document Formation in Minos: A Model and a System", ACM Transactions on Office Information Systems, vol. 4, No. 4, pp. 345-383 (Oct. 1986).

Ei-Kwae et al., "Document Image Representation Using XML Technologies", Proceedings of SPIE, vol. 4670, pp. 109-120 (2002).

Ellis, "Postscrip, Bezier Curves and Chinese Characters", ACM, pp. 162-165 (1989).

Girardot et al., "Efficient Representation and Streaming of XML Content Over the Internet Medium", IEEE, pp. 67-70 (2000).

Halvorson et al., "Microsoft Office XP Inside Out, 2001", Microsoft Press, pp. 272, 273 and 289.

Han et al., "WebSplitter: A Unified XML Framework for Multi-Device Collaborative Web Browsing", ACM, pp. 221-230 (2000).

Hardy et al., "Mapping and Displaying Structural Transformations Between XML and PDF", ACM 2002, pp. 95-102 (2002).

Holman, "What is XSL-FO", Google Mar. 20, 2002, http://www.xml.com/pub/a/2002/03/20/xsl-fo.html, 18 pages.

Jacobs et al., "Adaptive Grid-Based Document Layout", ACM Transactions on Graphics, vol. 22, No. 2, pp. 838-847 (Jul. 2003).

Marco et al., "A Framework for Designing and Implementing the Ada Standard Container Library", ACM, pp. 49-61 (2003).

Meyer, 0. "aTool-Creating Validated XML Documents on the Fly Using MS Word", pp. 113-121 (Oct. 2002).

Microsoft Word, (hereinafter Word), pp. 1-4 (Copyright 2001).

Miller, "An Introduction to the Resource Description Framework", D-Lib Magazine, ISSN 1082-9873, http://www.dlib.org/dlib/may98/miller/05miller.html, 10 pages (May 1998).

Obasanjo, "Designing Extensible, Versionable XML Formats", Google Jul. 21, 2004, http://www.xml.com/pub/a/2004/07/21/design.html, 17 pages.

Obasanjo, "Designing XML Formats: Versioning vs. Extensibility", Google 2004, blogs.msdn.com/dareobasanjo/archive/2004/04/11/111369.aspx. One additional page is included to show the actual date of the article which is Nov. 17, 2004, 24 pages.

Obasanjo, Designing XML Formats: Versioning vs. Extensibility, Google Apr. 11, 2004, blogs.msdn.com/dareobasanjo/archive/2004/04/11/111369.aspx, 3 pages.

Office Action Correspondence Subsystem, version 1.3 (herein after OACS), copyright Feb. 2003, pp. 1-2 to 1-123, 2-2 to 2-122 and 3-2 to 3-44).

OpenOffice.org, "OpenOffice.org User Guide for Version 1.1.x: Chapter 4: Spreadsheets in Cale", published May 7, 2004, pp. 1, 2, 179-254, http://documentation.openoffice.org/manuals/OO01.x.x/user_guide.pdf.

OpenOffice.org, "OpenOffice.org User Guide for Version 1.1.x: Chapter 5: Creating Presentations With Impress", published May 7, 2004, pp. 1, 2, 255-286, http://documentation.openoffice.org/manuals/OO01.x.x/user_guide.pdf.

Orchard, "Versioning XML Vocabularies", published on XML.com Dec. 3, 2003, http://web.archive.org/web/20031206005000/www.xml.com/pub/a/2003/12/03/versioning.html (This item is from the Internet Archive of xml.com dated Dec. 12, 2003), 12 pages.

Pawson, "Printing from XML: An Introduction to XSL-FO,", Google Oct. 9, 2002, http://www.xml.com/pub/a/2002/10/09/xslfo.html, 6 pages.

Peters et al., "CrystalWeb-A Distributed Authoring Environment for the World-Wide Web," Computer Networks and ISDN Systems, vol. 27, No. 6, pp. 861-870 (Apr. 1995).

ReplyAssistant, pp. 1-34 (Copyright 2001)

Sahuguet et al., "Building Intelligent Web Applications Using Lightweight Wrappers", Data and Knowledge Engineering, vol. 36, pp. 283-316 (2001).

StarOffice 7 Office Suite, A Sun ONE Software Offering, Basic Programmer's Guide, pp. 1-10, 47, 91, 104 (Jul. 2003).

Steele, "Easy Microsoft Office Word 2003", published Sep. 19, 2003, Que Corp., pp. 52, 53 and 216 (6 total pp.).

Unknown, ReplyAssistant Version 1.1, downloaded from <http://www.goldmedalsoft.com/shareware/Business_Finance-Miscellaneous-ReplyAssistant-1.1.html>, Copyright 2000-2001, 7 figures, 5 pages ReadMet, 1 page About ReplyAssistant, 15 pages.

van Leeuwen et al., "XML for Flexibility and Extensibility of Design Information Models", Proceedings of CAADRIA, University of Sydney, Australia, pp. 491-502 (2001).

Whitmer, R., "Document Object Model (DOM) Level 3 Xpath Specification", W3C, http://www.w3.org/TR/DOM-Level-3-XPath/, Feb. 26, 2004, Version 1.0, 18 pages.

U.S. Official Action mailed Sep. 20, 2005 in U.S. Appl. No. 10/836,326.

U.S. Official Action mailed May 31, 2006 in U.S. Appl. No. 10/836,326.

U.S. Official Action mailed Oct. 20, 2006 in U.S. Appl. No. 10/836,326.

U.S. Official Action mailed Apr. 9, 2007 in U.S. Appl. No. 10/836,326.

U.S. Official Action mailed Jul. 26, 2007 in U.S. Appl. No. 10/836,326.

U.S. Official Action mailed Feb. 22, 2008 in U.S. Appl. No. 10/836,327.

U.S. Official Action mailed Jun. 28, 2006 in U.S. Appl. No. 10/836,608.

U.S. Official Action mailed Dec. 12, 2006 in U.S. Appl. No. 10/836,608.

U.S. Official Action mailed Mar. 8, 2007 in U.S. Appl. No. 10/836,608.

U.S. Official Action mailed Jul. 27, 2007 in U.S. Appl. No. 10/836,608.

U.S. Official Action mailed Jan. 24, 2005 in U.S. Appl. No. 10/837,040.

U.S. Official Action mailed Jul. 15, 2005 in U.S. Appl. No. 10/837,040.

U.S. Official Action mailed Apr. 06, 2006 in U.S. Appl. No. 10/837,040.

U.S. Official Action mailed Sep. 29, 2006 in U.S. Appl. No. 10/837,040.

U.S. Official Action mailed Dec. 19, 2006 in U.S. Appl. No. 10/837,040.

U.S. Official Action mailed May 15, 2007 in U.S. Appl. No. 10/837,040.
U.S. Official Action mailed Jun. 14, 2007 in U.S. Appl. No. 10/955,622.
U.S. Official Action mailed Mar. 17, 2008 in U.S. Appl. No. 10/955,622.
U.S. Official Action mailed Aug. 2, 2007 in U.S. Appl. No. 11/018,405.
U.S. Official Action mailed Feb. 21, 2007 in U.S. Appl. No. 11/018,569.
U.S. Official Action mailed Mar. 18, 2008 in U.S. Appl. No. 11/018,569.
U.S. Official Action mailed Jun. 19, 2007 in U.S. Appl. No. 11/018,718.
U.S. Official Action mailed Mar. 21, 2007 in U.S. Appl. No. 11/018,910.
U.S. Official Action mailed Oct. 3, 2007 in U.S. Appl. No. 11/018,910.
U.S. Official Action mailed Oct. 1, 2007 in U.S. Appl. No. 11/018,912.
U.S. Official Action mailed Mar. 21, 2007 in U.S. Appl. No. 11/019,088.
U.S. Official Action mailed May 8, 2007 in U.S. Appl. No. 11/072,188.
U.S. Official Action mailed Dec. 28, 2007 in U.S. Appl. No. 11/072,188.
U.S. Official Action mailed Sep. 17, 2007 in U.S. Appl. No. 11/072,659.
U.S. Official Action mailed Feb. 4, 2008 in U.S. Appl. No. 11/125,907.
U.S. Official Action mailed Aug. 29, 2006 in U.S. Appl. No. 11/222,344.
U.S. Official Action mailed Feb. 22, 2007 in U.S. Appl. No. 11/222,344.
U.S. Official Action mailed Aug. 1, 2007 in U.S. Appl. No. 11/222,344.
U.S. Official Action mailed Oct. 3, 2006 in U.S. Appl. No. 11/222,442.
U.S. Official Action mailed Feb. 20, 2007 in U.S. Appl. No. 11/222,442.
U.S. Official Action mailed Jul. 10, 2007 in U.S. Appl. No. 11/222,442.
U.S. Official Action mailed Jun. 18, 2007 in U.S. Appl. No. 11/398,339.
U.S. Official Action mailed Mar. 25, 2008 in U.S. Appl. No. 11/398,339.
European Search Report dated Nov. 3, 2006 in EP 05111509.5.
European Search Report dated Dec. 19, 2007 in EP 05111677.0.
European Search Report dated Dec. 19, 2007 in EP 05111375.1.
European Search Report dated Dec. 19, 2007 in EP 05112123.4.
European Examination Report dated Mar. 3, 2008 in EP 05111375.1.
U.S. Official Action mailed Jan. 21, 2010 in U.S. Appl. No. 11/072,659 (14917.0066USI1 pp. 1-19.
U.S. Official Action mailed Dec. 9, 2009 in U.S. Appl. No. 11/431,931 (14917.0186USI1) pp. 1-33.

* cited by examiner

METHOD AND SYSTEM FOR EXPOSING NESTED DATA IN A COMPUTER-GENERATED DOCUMENT IN A TRANSPARENT MANNER

FIELD OF THE INVENTION

The present invention generally relates to managing data across different computer-generated documents. More particularly, the present invention relates to methods and systems for exposing nested data in computer-generated documents in a transparent manner.

BACKGROUND OF THE INVENTION

With the advent of the computer age, computer and software users have grown accustomed to user-friendly software applications that help then write, calculate, organize, prepare presentations, send and receive electronic mail, make music, and the like. For example, modem electronic word processing applications allow users to prepare a variety of useful documents. Modem spreadsheet applications allow users to enter, manipulate, and organize data. Modem electronic slide presentation applications allow users to create a variety of slide presentations containing text, pictures, data or other useful objects.

Documents, spreadsheets, presentations, and the like generated by such applications are often created from a variety of existing content such as other documents, spreadsheets, presentations, databases, images, etc. These so-called compound documents thereby often have embeddings that have the potential to create problems in documents by creating opaque regions in otherwise transparent files. In many embedding scenarios, there is communication between the containing or receiving application (the client application) and the application that generates the embedding (the server application).

A variety of problems may be caused when such compound documents are saved and/or repurposed (e.g., emailed to another user, tools run against, consumed by another application). One type of problem associated with such compound documents includes accidental information disclosure. For example, when documents contain documents or portions of other documents (embedded objects), it is often difficult to determine exactly what content is included in the embedded object. For example, a slide presentation document may include an embedded spreadsheet chart that is a view of salary information for a company. From within the presentation, it may appear as though it is only a summary of the salary information that may be suitable for a target audience. In fact, the embedded object may include underlying information that provides all details associated with the subject salary information. Under such a scenario, an unsuspecting manager might send the presentation around to a target audience not realizing that he/she has exposed detailed salary information for each employee in the company.

Another problem associated with such compound documents includes accidental or even intentional distribution of software code and/or viruses. While most anti-virus scanners know how to check for particular file types associated with known viruses, such scanners may not necessarily support scanning into all embedded content for determining whether the embedded content contains unacceptable code or a virus.

Another problem associated with such compound documents includes difficulties associated with integrating such documents into existing application solutions. In general, the way embedded content is stored within a document file format is different from the original document format. For example, an embedded chart in a presentation might use the chart syntax for the chart with some type of wrapper as defined by the presentation format. Even if a given solution can integrate with the presentation syntax, the solution may not be able to integrate with the chart syntax. The consequences of this integration problem may be that a solution provider/integrator might need to build a custom application solution for each type of embedded content, and in a large organization or government, this may be a prohibitive amount of work, especially given the lifetimes of documents and the pace at which document solutions and tools change.

It is with respect to these and other considerations that the present invention has been made.

SUMMARY OF THE INVENTION

Embodiments of the present invention solve the above and other problems by providing methods and systems for exposing nested data in computer-generated documents in a transparent manner. According to one embodiment, a mechanism is provided for a client application to query a server application for a list of available file formats after an object is requested from a server application document for embedding into a client application document. According to another embodiment, a mechanism is provided for the client application to request a particular format associated with the embedded object from the server application document. According to these embodiments, the ability to nest one transparent container (document or object) into another transparent container is also provided. For example, nesting one document or document object within another document or document object allows file formats that may be used against the containing document or object to be used against the embedded document or document object. Once the client application obtains file format information available to the server application or associated with the particular object, the client application may utilize the obtained file formats for utilizing or operating on the embedded object according to the native file formats associated with the embedded object.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for exposing nested data associated with an object embedded into a client application document from a server application document so that a client application may understand and utilize formatting, methods, mechanisms and processes associated with the embedded object so that the embedded object does not become an opaque region in the client application document outside of the functional reach or understanding of the client application. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
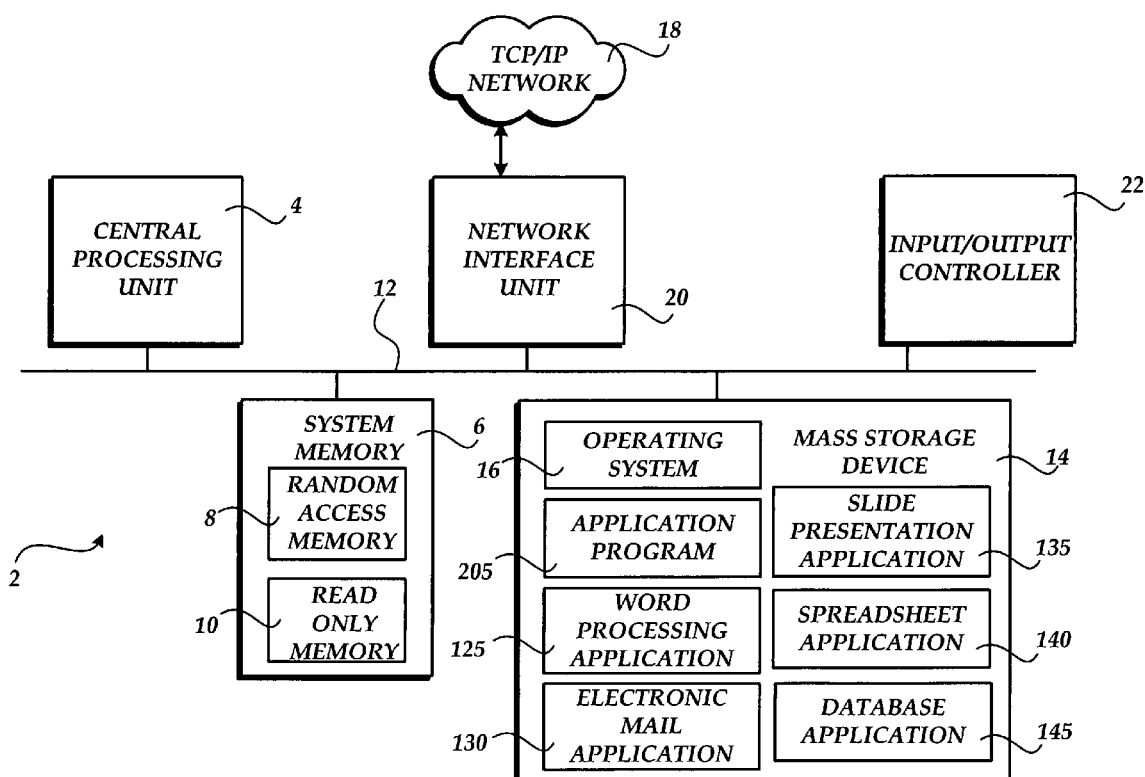
FIG. 1 is a block diagram showing the architecture of a personal computer that provides an illustrative operating environment for embodiments of the present invention.

Referring now to the drawings, in which like numerals refer to like elements through the several figures, aspects of the present invention and an exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 205 for providing a variety of functionalities to a user. For instance, the application program 205 may comprise many types of programs such as a word processing application, a spreadsheet application, a desktop publishing application, and the like. According to an embodiment of the present invention, the application program 205 comprises a multiple functionality software application suite for providing functionality from a number of different software applications. Some of the individual program modules that may comprise the multiple functionality application suite 205 include a word processing application 125, a slide presentation application 135, a spreadsheet application 140 and a database application 145. An example of such a multiple functionality application suite 205 is OFFICE manufactured by Microsoft Corporation. Other software applications illustrated in FIG. 1 include an electronic mail application 130.

Figure 2:
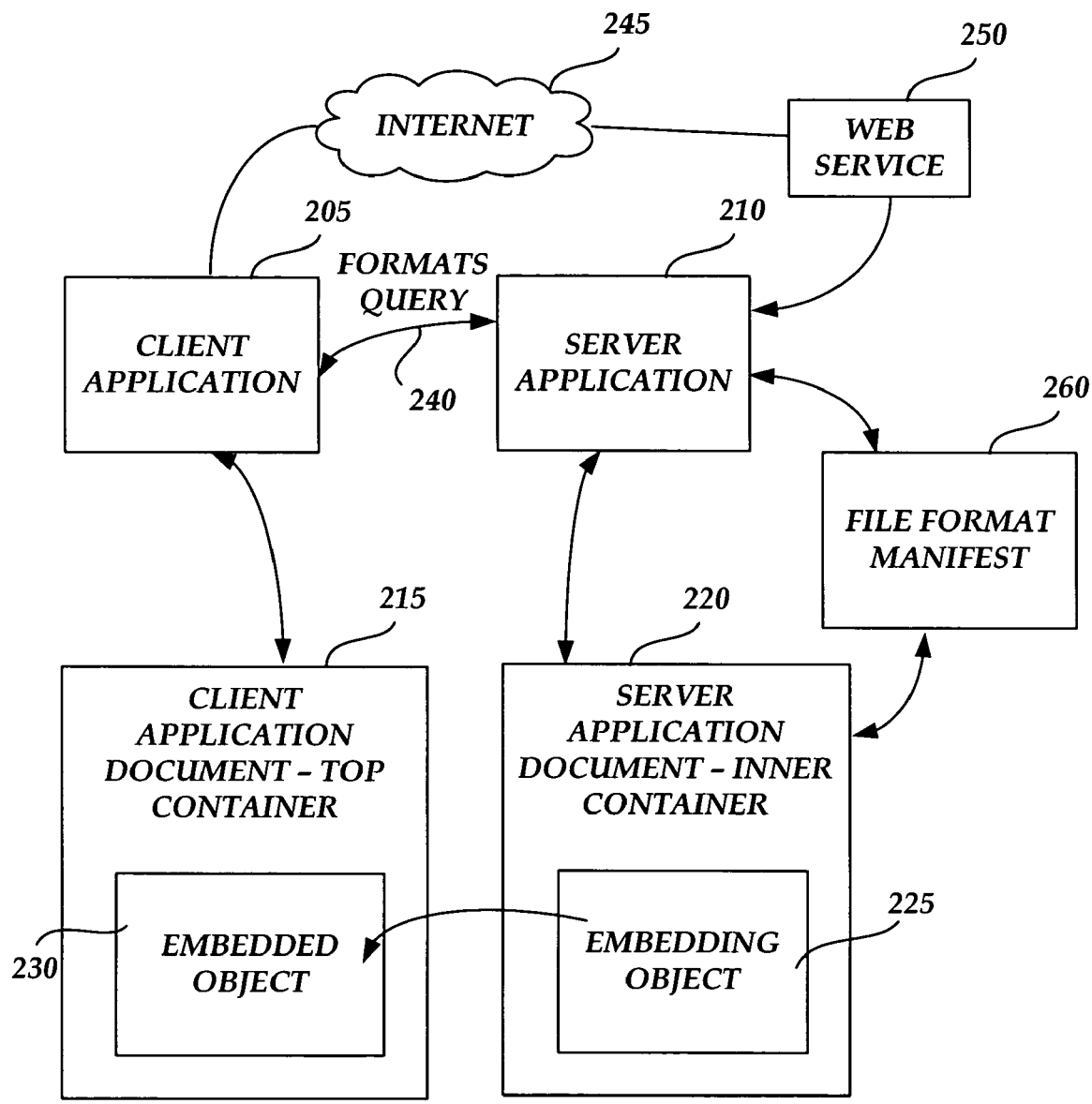
FIG. 2 is a simplified block diagram illustrating interaction between a client application and a server application for obtaining formatting and other information about an embedded object embedded into a client application document from a server application document.

FIG. 2 is a simplified block diagram illustrating interaction between a client application (client) and a server application (server) for obtaining formatting and other information about an object embedded into a client application document from a server application document. Referring to FIG. 2, a client application document 215 representing a top-level container receives an embedded object 230 from a server application document representing an inner container. The embedding object 225 represents text, data, pictures, images, charts, and the like that is copied to or moved to the client application document 215, or that is pointed to by the client application document 215.

The client application 205 is representative of a software application being utilized for generating or editing the client application document. The server application 210 is representative of a software application being used for generating or editing the server application document. The client application 205 and the server application 210 may represent multi-application suites containing multiple software applications, for example, word processing applications, spreadsheet applications, slide presentation applications, database applications, and the like. In addition, as should be understood, the client application 205 and the server application 210 may be two of such multiple applications belonging to a single application suite. On the other hand, the client application 205 and the server application 210 may be separate applications operated by different users or entities in a distributed computing network where the client application 205 is enabled to communicate with the server application as described herein.

As illustrated in FIG. 2, an embedding object 225 is embedded into a client application document 215 in order to insert the data, coding or other information associated with the embedding object 225 into the client application document 215 as an embedded object 230. For example, the client application 205 may be a word processing application with which a client application document 215, for example, a memorandum, is being generated or edited. In order to provide a chart of data, for example, salary information for all sales employees of a given organization, the author/editor of the client application document 215 may desire to embed a chart object 225 from a server application document 220, for example, a spreadsheet document, generated or edited by a server application 210, for example, a spreadsheet application. As briefly described above, a problem with prior methods and systems for embedding objects into a client application document results from an inability of the client application 205 responsible for generating and/or editing the client application document 215 to understand or read formatting information, properties, methods, mechanisms, and the like associated with the embedded object imparted to the embedded object by the server application 210 responsible for generating and/or editing the embedded object.

For example, the following is a simplified Extensible Markup Language (XML) representation of a sample word processing document having an embedded slide presentation application object in the sample word processing document. As should be understood by those skilled in the art, the example XML representations illustrated and described below are simplified, are for purposes of example only, and are not limiting in any way of the application or operation of embodiments of the present invention described herein. Referring to the example XML representation below, the information contained in the following representation after the XML markup "<w:binData w:name="oledata.mso">" and before the XML markup </w:binData> is representative of the slide presentation object embedded into the sample word processing document. As can be seen, the information associated with the embedded object may be very difficult to understand, if at all, by the client application generating or editing the associated client application document, for example, the word processing document.

```
<?xml version="1.0" encoding="UTF-8" standalone="yes"?>
<?mso-application progid="Word.Document"?>
 <w:wordDocument
xmlns:w=http://schemas.microsoft.com/office/word/2003/wordml>
<w:docOleData>
   <w:binData w:name="oledata.mso">
     0M8R4KGxGuEAAAAAAAAAAAAAAAAAAAAAPgADAP7/CQA
GAAAAAAAAAAAAAAABAAAAAQAAAAAAAAAAEAAAAgAAAAEA
AAD+////AAAAAAAAAAD////////////////////////////////////////////////
////////////////////////////////////////////////////////////////////
/////////////////////////////////////////////////////DEANQAzADE
ANAAxADUAOQA0AAAAAAAAAAAAAAAAAAAAAAAAAAAAAAAA
AAAAAAAAAAAAAAAAAAAAAAAAABgAAgH//////////8AAAAAAA
AAAAAAAAAAAAAAAAAAAAAAAAAAAAAAAAAAAAAAAAAAAAAA
AWgoAAAAAAAAAAAAAAAAAAAAAAAAAAAAAAAAAAAAAAAAA
AAAAAAAAAAAAAAAAAAAAAAAAAAAAAAAAAAAAAAAAAAAAA
AAAAAAAAAAAAAAP//////////wAAAAAAAAAAAAAAAAAAAAAA
AAAAAAAAAAAAAAAAAAAAAAAAAAAAAAAAAAAAAAAAAAAAA
AAAAAAAAAAAAAAAAAAAAAAAAAAAAAAAAAAAAAAAAAAAAA
AAAAAAAAAAAAAAAAAAAAAAAAAAAAAAAAAAAAAAAAAA///////
/////////AAAAAAAAAAAAAAAAAAAAAAAA
       o9RcjOS6a7TCVdc9sz2e+UeMivhf3rqQ16rKUv5C1/GrIg50C2abLymb
5dtQ0193p4PwRNzkJ+3vazrk5e5zmsU24+e1V75Pznd8785xzBOQBLAJUIHY
hKSfq0nDgmiGYAM4ELgVnARcDFwHuACmA2YAFzgLnAe4F5wPuAS4B
LgfnAZcD7gQXAQmARsBi4HKgErgA+AFQBHwQ+BFwJfBhYA1wFXA1cA
3wE+Cjx2kZ0LVADLAU+BtQCdcB1wDLg48By4Hpl+w2obwRWAJ8E6oEg
8CnVf64WxKLuHxEf6U1zzhxEqmiw3pgqY3/k3OcxXxFujscSsVDSCsY67Hg
wFo4mrYZIuMUWIbSiIRi3E3Y02ZQMx6IiinJ0iwXd4iV0/Koff3FcDQwRk2d
fTpgcbxy7a/rvPbbB5Pg+bhj018qG1qaOqHVzOBJpisei7KUGaqUm6sBctehmC
iNzRfAcx7yNnqX005ixXk0f9Z5zxNBXd73+Vn1r4Pv3+mnBpQ8/w/H+b5Lzk
ftvIbkHawQ497aRnLObSM7b3STn5g/UN4Mk1/AjJOcxJ+
    </w:binData>
</w:docOleData>
<w:p>
  <w:r>
    <w:t>
    This is some text
    </w:t>
  </w:r>
</w:p>
```

According to embodiments of the present invention, when an embedded object is requested by a client application document 215 for embedding in the client application document as an embedded object 230, the client application 205 queries the server application 210 responsible for generating and/or editing a server application document from which the embedded object 230 is being requested for formatting information, properties, methods, mechanisms, and/or the like associated with the requested object. The client application 205 requests from the server application 210 information about the requested object to allow the client application 205 to understand the formatting, coding and other properties associated with the requested object and to enable the client application 205 to operate on the requested object according to the properties imparted to the embedded object by the server application so that the embedded object coding, formatting and properties become transparent and available to the client application.

As described above, the client application requests information about the requested object to enable the client application to better utilize the requested object. According to prior and well-known OLE object embedding principles, an embedded object may include various information that may be available to the client application 205. For example, metafile information may be passed to the client application that is an image that the server application returns from the serving application. But, because the client application does not understand the embedded object's file format, according to prior methods, it is up to the server application to give the client application an image to use to display the object. For instance, if a spreadsheet object is embedded in a word processing document, the view that is displayed of that spreadsheet object in the word processing document is an image of the spreadsheet object. The image is updated whenever the embedded object is activated, and usually this happens when a user double clicks on the embedded object. Other information may include a classID that identifies the server application that should be called to render the embedded object. That is, the classID maps to the server application. Additional information may include information regarding actual persistence of the file. According to one embodiment this information is in the form of an IStorage format. For example, a spreadsheet object within a word processing document is stored similarly as it is stored when it is saved by the spreadsheet application (server).

According to embodiments of the present invention, the metafile information is stored as a separate image that any client application can access as needed. For example, when the image is saved, rather than write the information out as a simple binary data file, the registry is surveyed to determine if the application that matches the classID for the requested object has indicated a content type for the object. According to embodiments, the content type identifies the object. For example, for an image object of a server document, the content type associated with the object may be "JPEG" or "GIF." If the server application has identified a content type for the object, then a determination is made as to what file extension is associated with the identified content type. If a content type and a file extension are determined, then the client application may call out the content type and apply the correct extension to the file (object). The client application may then take the requested object from the server application document and treat the requested object as a native object of the client application because the client application understands the content type and file extension. In addition, the registry may be surveyed to determine if the persistence format for the file (requested object) is an IStorage format. Some file formats like the well-known ".doc" format are in IStorage format. According to embodiments of the present invention, the object data stream may be "wrapped" in an IStorage format so that it can also be acted on by the client application as described herein.

According to an embodiment, objects may be embedded in embedded objects. For example, a chart object embedded into a word processing document may, in turn, include a slide presentation object from a slide presentation application embedded into the chart object. Accordingly, the slide presentation object would be embedded in the chart object, which may then be embedded in the client application document 215 as the embedded object 230. According to embodiments of the present invention, the server application 210 would request and receive formatting information, properties, methods and mechanisms associated with the slide presentation object embedded into the chart object, and ultimately, the client application 205, for example, a word processing application, would receive formatting information, properties, methods and mechanisms associated with the embedded object from both the example spreadsheet application and the example slide presentation application associated with the slide presentation application object embedded into the chart object.

The following is a simplified XML representation illustrating the nesting of one container (document or object) into another container (document or object). For the following example, consider a first object includes a parts list and consider that an embedded object includes parts identification information.

```
<container>
    <partslist>
        <part id="1"/>
        <container>
            <partslist>
                <part id=1'"/>
                <part id="2"/>
            </partslist>
        </container>
        <part id="n"/>
    </partslist>
</container>
```

According to a particular example implementation types could be assigned to "parts" and the <part id="#"/> syntax could be replaced with <part id="#" type="item"/> and the nested <container> could be replaced with <part id="#" type="container"/>. In addition, an inheritance model with the nested containers may be created. For example, metadata may be associated with a container (document or object) that describes whether or not code might be found within the embedded document's or object's parts. As shown below, this metadata association may be made by using an attribute on the <container> element.

```
<container containscode="false">
    <partslist>
        <part id="1"/>
        ...
        <part id="n"/>
    </partslist>
</container>
```

By creating a hierarchy between nested objects, many problems associated with nested objects described above may be addressed. For example, given the example above, if an embedding is added to the container that contains code (e.g., potential virus), without a hierarchical relationship between the embedded object and the receiving document or object a representation like the following representation may result.

```
<container containscode="false">
    <partslist>
        <part id="1"/>
        <container containscode="true">
            <partslist>
                <part id=1'"/>
                <part id="2"/>
            </partslist>
        </container>
        <part id="n"/>
    </partslist>
</container>
```

On the other hand, with a relationship between the embedded object and the containing document or object (container), an improved representation such as the following may be generated.

```
<container containscode="true">
    <partslist>
        <part id="1"/>
        <container containscode="true">
            <partslist>
                <part id=1'"/>
                <part id="2"/>
            </partslist>
        </container>
        <part id="n"/>
    </partslist>
</container>
```

As described herein, when an embedding object 225 is requested from a server application document 220 for embedding in a client application document 215 as an embedded object 230, a formats query 240 is passed from the client application 205 to the server application 210 for information about file formats associated with the requested object. As described herein, the term "file formats" is meant to include format types, for example, Hypertext Markup Language (HTML), rich text formatting (RTF), XML, and the like, formatting properties, and methods and/or mechanisms (coding) utilized by the server application for generating or editing the requested object.

According to one embodiment of the present invention, the client application 205 passes an application program interface (API) call to the server application 210 for the requested information. According to this embodiment, the client application 205 may pass a first API call for obtaining all file formats available from the server application that may have been used by the server application on or in association with the requested object. The first API call may be in the form of "EnumerateFileFormats( )" for obtaining a listing of all file formats available from the server application 210 that may be utilized by the server application for formatting or applying properties to the requested object. If the server application is of a different type as the client application (e.g., spreadsheet application versus word processing application), the client application may need a list of all available file formats for operating the embedded object according to the file formats native to the object as received from the server application document.

Alternatively, a second API call may be passed to the server application to obtain only the file format information associated with the requested object. For example the second API call may be in the form of "GetFileData(fileformat)" and may be passed from the client application 205 to the server application 210 for obtaining particular format information applied to the particular requested object. Once the client application 205 obtains a listing of available file formats and/or particular file formats applied to the requested object, the client application 205 may utilize the requested object in the client application document 215 in a transparent manner as the client application 205 would utilize or operate on other data or information contained in the client application document 215.

According to alternative embodiments, the formats query 240 between the client application 205 and the server application 210 may take the form of a web service 250, illustrated in FIG. 2, for obtaining file format information from the server application 210. As should be understood, the server application 210 may be located separately from the client application 205 over a distributed computing network such as the Internet 245. According to this embodiment of the present invention, a web service 250 may be utilized for receiving queries from client applications 205 and for obtaining requested file format information from server applications 210. According to a web service application 250, the client application 205 does not have to generate API calls or other requests according to the known language or protocols of the server applications 210. That is, the web service 250 may operate as an interface or layer between the requesting client application 205 for receiving requested information from server applications associated with requested server application documents and requested embedding objects 225.

According to another embodiment, a file format manifest may be generated by the server application 210 for enumerating file formats available from the server application or that are associated with particular objects from server application documents. According to this embodiment, when an embedding object 225 is requested from a server application document 220 for embedding into a client application document 215, the formats query 240 from the client application 205 to the server application 210 requests the file format manifest 260 from the server application 210 associated with the server application document and the embedding object 225. Once the client application 205 receives the file format manifest 260, the client application 205 may parse the file format manifest 260 to obtain file format information associated with the server application 210 or to obtain particular file format information associated with the requested embedding object 225.

Figure 3:
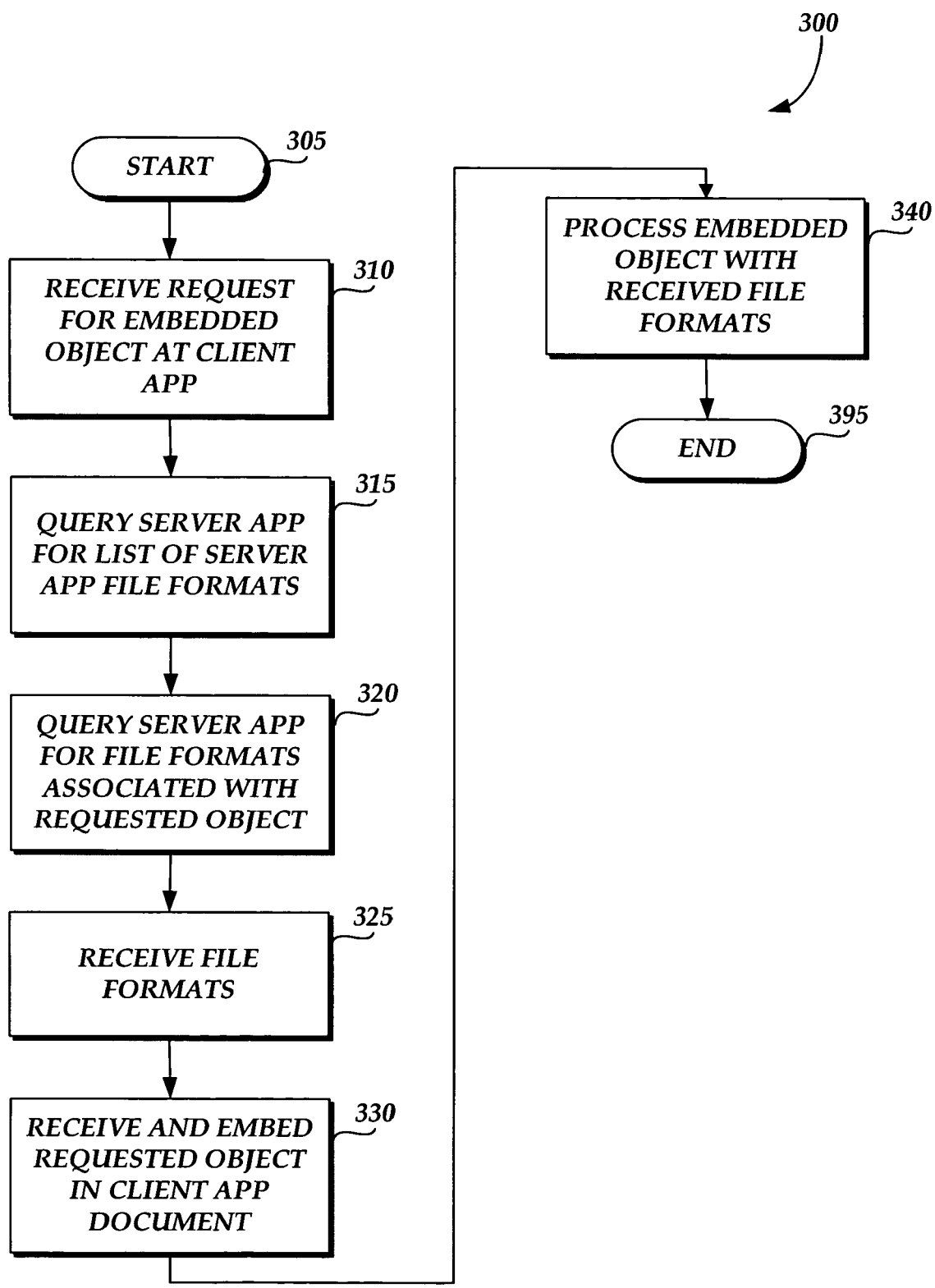
FIG. 3 is a flow diagram illustrating steps performed by a method and system of the present invention for exposing nested data associated with an embedded object embedded into a client application document from a server application document according to embodiments of the present invention.

Having described embodiments of the present invention with respect to FIGS. 1 and 2 above, FIG. 3 is a flow diagram illustrating steps performed by a method and system of the present invention for exposing nested data associated with an embedded object embedded into a client application document from a server application document. The routine 300 begins at start block 305 and proceeds to block 310 where a request is received at the client application 205 for an embedded object in the client application document 215. For example, the request may be in the form of a copying of a chart object from a spreadsheet document 220 containing employee salary information into a memorandum document 215 being generated with a word processing client application 205.

At block 315, in response to the request for the embedded object 230 into the client application document 215, the client application 205 sends a formats query 240 to the server application 210 for a listing of application file formats available from the server application 210, for example, a spreadsheet application. As describe above, the formats query 240 may be in the form of an API call to the server application 210, or the formats query 240 may be a call to a web service 250, or the formats query 240 may be a request for a file format manifest 260 for review by the client application 205. At block 320, the client application 205 queries the server application 210 for particular file formats information associated with the requested object 225. As should be understood, the query from the client application to the server application for both a listing of available file formats and for particular file formats associated with the requested object may be in the form of a single formats query 240.

At block 325, the requested file formats information is received by the client application 205, and at block 330, the client application 205 receives and embeds the requested object 225 into the client application document 215 as the embedded object 230. At block 345, the client application 205 utilizes the received file format information for processing and for rendering transparent the embedded object 230. For example, if the embedded object 230 is a chart object from a spreadsheet application document containing a summary of employee salary information, because the client application 205 has access to file format information associated with the embedded object, all other information associated with the embedded object becomes transparent to the client application 205. For example, if the embedded object also includes detailed employee information associated with the summary salary information, the client application 205 may access the detailed employee information and may process or otherwise operate on the detailed information associated with the embedded object because the client application 205 has access to file formats, methods, mechanisms or other properties applied to or associated with all data contained or associated with the embedded object as received from the server application document 220 and as imparted to the embedded object by the server application 210. The method ends at block 395.

As described herein, methods and systems provide for exposing nested data contained in an embedded object so that a client application receiving the embedded object may understand file formats and other properties associated with the embedded object for allowing the embedded object and its associated file formats and properties to be transparent to the receiving client application. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for exposing formatting information about an embedded object to a receiving software application, comprising:

receiving a request for embedding an object from a second document into a first document, whereby receiving a request for embedding an object from a second document into a first document includes receiving a request for embedding an object where the requested object includes a second embedded object embedded in the requested object;

querying a server application from which the second document is generated for any file formats associated with the requested object;

receiving at a client application from which the first document is generated the any file formats associated with the requested object, whereby receiving at a client application from which the first document is generated the any file formats associated with the requested object includes receiving at the client application any file formats associated with the second embedded object;

reviewing a list of file formats available from a server application and reviewing particular file formats associated with the requested object to allow the client application to understand the any file formats associated with the requested object and to allow the client application to operate the embedded object according to the any file formats associated with the requested object;

determining at the client application how to embed the requested object in the first document in order to comply with the any file formats associated with the requested object, wherein the determination is made by:
identifying a content type for the requested object; and
in response to determining the content type, determining a file extension associated with the identified content type;

embedding the requested object in the first document; and exposing to the client application the any file formats associated with the requested object for allowing the client application to operate the embedded object according to the any file formats associated with the embedded object, whereby exposing to the client application the any file formats associated with the requested object for allowing the client application to operate the embedded object according to the any file formats associated with the embedded object includes exposing to the client application the any file formats associated with the second embedded object for allowing the client application to operate the second embedded object according to the any file formats associated with the second embedded object.

2. The method of claim 1, whereby querying the server application for the any file formats associated with the requested object includes passing an API call from the client application to the server application requesting the any file formats associated with the requested object.

3. The method of claim 2, whereby passing an API call from the client application to the server application requesting the any file formats associated with the requested object includes passing an API call of the form GetFileData(fileformat) to the server application.

4. The method of claim 1,
whereby receiving at a client application from which the first document is generated the any file formats associated with the requested object includes receiving a file formats manifest from the server application identifying the any file formats associated with the requested object; and
whereby exposing to the client application the any file formats associated with the requested object includes providing the client application access to the any file formats associated with the requested object identified on the file formats manifest.

5. The method of claim 1, further comprising:
querying the server application for a list of all file formats available from the server application;
receiving at the client application the list of all file formats available from the server application; and
whereby exposing to the client application the any file formats associated with the requested object for allowing the client application to operate the embedded object according to the any file formats associated with the embedded object includes exposing to the client application the list of all file formats available from the server application for allowing the client application to operate the embedded object according to all file formats available from the server application.

6. The method of claim 5, whereby querying a server application for a list of all file formats available from the server application includes passing an API call from the client application to the server application requesting the list of all file formats available from the server application.

7. The method of claim 6, whereby passing an API call from the client application to the server application requesting the list of all file formats available from the server application includes passing an API call of the form EnumerateFileFormats( ) to the server application.

8. The method of claim 5,
whereby receiving at the client application the list of all file formats available from the server application includes receiving a file formats manifest from the server application identifying all file formats available from the server application; and
whereby exposing to the client application the list of all file formats available from the server application for allowing the client application to operate the embedded object according to all file formats available from the server application includes providing the client application access to the all file formats available from the server application identified on the file formats manifest.

9. A method for managing data across different computer-generated documents, comprising:
receiving a request for embedding an object from a second document into a first document, whereby receiving a request for embedding an object from a second document into a first document includes receiving a request for embedding an object where the requested object includes a second embedded object embedded in the requested object;
querying a server application from which the second document is generated for a list of file formats available from the server application;
querying the server application for any particular file formats associated with the requested object;
receiving at a client application from which the first document is generated the list of file formats available from the server application, whereby receiving at a client application from which the first document is generated the list of file formats associated with the requested object includes receiving at the client application any file formats associated with the second embedded object;
reviewing the list of file formats available from the server application and reviewing the particular file formats associated with the requested object to allow the client application to understand any file formats associated with the requested object and to allow the client application to operate the embedded object according to any file formats associated with the requested object;
determining at the client application how to embed the requested object in the first document in order to comply with any file formats associated with the requested object, wherein the determination is made by:
identifying a content type for the requested object; and
in response to determining the content type, determining a file extension associated with the identified content type;
receiving at the client application any particular file formats associated with the requested object;
embedding the requested object in the first document; and
exposing to the client application any file formats associated with the requested object for allowing the client application to operate the embedded object according to the any file formats associated with the embedded object, whereby exposing to the client application the any file formats associated with the requested object for allowing the client application to operate the embedded object according to the any file formats associated with the embedded object includes exposing to the client application the any file formats associated with the second embedded object for allowing the client application to operate the second embedded object according to the any file formats associated with the second embedded object.

10. The method of claim 9, whereby querying a server application from which the second document is generated for a list of file formats available from the server application includes passing an API call from the client application to the server application requesting the list of file formats available from the server application.

11. The method of claim 10, whereby passing an API call from the client application to the server application requesting the list of file formats available from the server application includes passing an API call of the form EnumerateFileFormats( ) to the server application.

12. The method of claim 9, whereby querying the server application for any particular file formats associated with the requested object includes passing an API call from the client application to the server application requesting any particular file formats associated with the requested object.

13. The method of claim 12, whereby passing an API call from the client application to the server application requesting any particular file formats associated with the requested object includes passing an API call of the form GetFileData (fileformat) to the server application.

14. A computer-readable storage medium having computer-executable instructions stored thereon which when executed by a computer perform a method for exposing formatting information about an embedded object to a receiving software application, comprising:
receiving a request for embedding an object from a second document into a first document, whereby receiving a request for embedding an object from a second document into a first document includes receiving a request for embedding an object wher the requested object includes a second embedded object embedded in the requested object;
querying the server application for a list of all file formats available from the server application;
querying a server application from which the second document is generated for any file formats associated with the requested object;
receiving at the client application the list of all file formats available from the server application, whereby receiving at a client application from which the first document is generated the list of all file formats associated with the requested object includes receiving at the client application any file formats associated with the second embedded object;
reviewing the list of all file formats available from the server application and reviewing particular file formats associated with the requested object to allow the client application to understand the any file formats associated with the requested object and to allow the client application to operate the embedded object according to the any file formats associated with the requested object;
determining at the client application how to embed the requested object in the first document in order to comply with the any file formats associated with the requested object, wherein the determination is made by:
identifying a content type for the requested object; and
in response to determining the content type, determining a file extension associated with the identified content type;

receiving at a client application from which the first document is generated the any file formats associated with the requested object;

embedding the requested object in the first document; and exposing to the client application the any file formats associated with the requested object for allowing the client application to operate the embedded object according to the any file formats associated with the embedded object, whereby exposing to the client application the any file formats associated with the requested object for allowing the client application to operate the embedded object according to the any file formats associated with the embedded object includes exposing to the client application the any file formats associated with the second embedded object for allowing the client application to operate the second embedded object according to the any file formats associated with the second embedded object.

15. The computer-readable storage medium of claim 14, further comprising:
whereby exposing to the client application the any file formats associated with the requested object for allowing the client application to operate the embedded object according to the any file formats associated with the embedded object includes exposing to the client application the list of all file formats available from the server application for allowing the client application to operate the embedded object according to all file formats available from the server application.

16. The computer-readable storage medium of claim 15, whereby querying the server application for the any file formats associated with the requested object includes passing an API call from the client application to the server application requesting the any file formats associated with the requested object.

17. The computer-readable storage medium of claim 16, whereby querying a server application for a list of all file formats available from the server application includes passing an API call from the client application to the server application requesting the list of all file formats available from the server application.

* * * * *